US005888623A

United States Patent [19]

Katzer

[11] Patent Number: 5,888,623

[45] Date of Patent: Mar. 30, 1999

[54] SANITARY ARTICLE OR PLUMBING FITTING WITH A COATED SURFACE AND A PRINT IMAGE APPLIED THERETO AND A PROCESS FOR MAKING THE SAME

[75] Inventor: Dieter Katzer, Haslach, Germany

[73] Assignee: Hans Grohe GmbH & Co. KG, Schiltach, Germany

[21] Appl. No.: 650,418

[22] Filed: May 20, 1996

Related U.S. Application Data

[63] Continuation-in-part of Ser. No. 210,712, Mar. 18, 1994, abandoned.

[30] Foreign Application Priority Data

Mar. 20, 1993 [DE] Germany .......................... 43 08 977.1

[51] Int. Cl.$^{6}$ .......................... B32B 3/00

[52] U.S. Cl. .......................... 428/195; 428/63; 428/64.1; 428/148; 428/174; 428/204; 428/207; 428/209; 428/401; 427/305; 427/306; 427/385.5; 427/437

[58] Field of Search .......................... 428/195, 207, 428/204, 174, 148, 401, 63, 64, 209; 427/437, 305, 306, 27, 385.5

[56] References Cited

U.S. PATENT DOCUMENTS

| | | | |
|---|---|---|---|
| 3,644,160 | 2/1972 | Valentine et al. | 156/250 |
| 4,109,326 | 8/1978 | Holt | 4/559 |
| 4,164,314 | 8/1979 | Edgar | 229/125 |
| 4,590,115 | 5/1986 | Cassat | 428/174 |
| 4,751,934 | 6/1988 | Moir et al. | 132/319 |
| 4,752,469 | 6/1988 | Fellows et al. | 424/117 |
| 4,848,378 | 7/1989 | Moir et al. | 132/319 |
| 4,925,667 | 5/1990 | Fellows et al. | 424/401 |
| 5,354,397 | 10/1994 | Miyake et al. | 156/77 |

FOREIGN PATENT DOCUMENTS

| | | |
|---|---|---|
| 0220376 | 6/1986 | European Pat. Off. . |
| 2917417 | 4/1979 | Germany . |
| 2935584 | 9/1979 | Germany . |
| 3417355 | 5/1984 | Germany . |
| 3422286 | 6/1984 | Germany . |
| 3440131 | 11/1984 | Germany . |
| 3728883 | 8/1987 | Germany . |
| 3728884 | 8/1987 | Germany . |
| 3731433 | 9/1987 | Germany . |
| 3824012 | 7/1988 | Germany . |
| 3943556 | 5/1989 | Germany . |
| 3920410 | 6/1989 | Germany . |
| 3935602 | 10/1989 | Germany . |
| 3936973 | 11/1989 | Germany . |

(List continued on next page.)

OTHER PUBLICATIONS

Verseau, Jean, Prägen mit metallisierten Folien, Coating Aug. 1969, pp. 258–261.

N.N., Dekorieren von Metalloberflächen durch Transferdruck, Metalloberfläche, 37, 1983, 11, pp. 473–475.

Derwent Publications Ltd., London, Great Britain, Accession No. 77–22708Y, Database WPI Week 7713, Abstract: *Decorative Reinforced Plastic moldings,* JP–A–52 021 073 (Dainippon Printing KK).

Derwent Publications Ltd., London, Great Britain, Accession No. 92–061780, Database WPI, Week 9208. Abstract: *Plastic Sheet Coated Galvanized Decorative Board Preparation,* JP–A–4 008 540 (Kawasaki Steel KK).

European Patent Office Search Report of Mar. 20, 1995, for Counterpart EPO Appln. No. 94104038.8.

*Primary Examiner*—William Krynski
*Assistant Examiner*—Abraham Bahta
*Attorney, Agent, or Firm*—Eckert Seamans Cherin & Mellott, LLC

[57] ABSTRACT

A sanitary article, particularly a sanitary fitting or plumbing fitting, having a coated surface, in which on a coating face and/or below a coating face is provided at least one print image which color-contrasts with the coating.

22 Claims, 2 Drawing Sheets

FOREIGN PATENT DOCUMENTS

| | | |
|---|---|---|
| 3938200 | 11/1989 | Germany . |
| 4012020 | 4/1990 | Germany . |
| 4021907 | 7/1990 | Germany . |
| 4024200 | 7/1990 | Germany . |
| 4038681 | 12/1990 | Germany . |
| 4042191 | 12/1990 | Germany . |
| 4112144 | 4/1991 | Germany . |
| 4218475 | 1/1992 | Germany . |
| 1123207 | 8/1968 | United Kingdom . |
| 1541444 | 2/1979 | United Kingdom . |
| 1559715 | 1/1980 | United Kingdom . |
| 9202667 | 7/1991 | WIPO . |

SANITARY ARTICLE OR PLUMBING FITTING WITH A COATED SURFACE AND A PRINT IMAGE APPLIED THERETO AND A PROCESS FOR MAKING THE SAME

CROSS REFERENCE TO RELATED APPLICATIONS

This is a continuation-in-part of Application Ser. No. 08/210,712 filed Mar. 18, 1994 now abandoned.

BACKGROUND OF THE INVENTION

1. Field of the Invention

The present invention relates to a sanitary article, particularly a sanitary fitting or a plumbing fitting, having a coated surface. The invention also relates to a process for applying a surface coating to a sanitary article.

2. Background

Sanitary fittings and plumbing fittings are normally made from metals such as e.g. brass and for corrosion protection purposes have a surface chromium plating. The chromium plating leads to a uniform, silver-colored, smooth surface and therefore also has a decorative effect. Over the last few years the trend in the sanitary sector has increasingly been towards colored fittings. Therefore processes have been developed for giving a colored coating to sanitary articles, e.g. by varnishing, lacquering, electrolyte or powder coating. It is known to carry out coating with a powder varnish based on thermosetting plastics, which harden or cure at elevated temperatures. However, this only leads to few possibilities for decorative and in particular multicolor designs. There are also problems when combining the colored coating with metallic decors, such as e.g. gold decors, so that the manufacturing process is made more complicated and expensive. There is also a need for sanitary articles, which both for ornamental and informative purposes can be provided with permanent, pictorial representations or inscriptions.

The problem of the present invention is therefore to make available a sanitary article having a coated surface which, in addition to the protection function, can also fulfill decorative and informative functions, whilst also being simple and inexpensive to manufacture.

SUMMARY OF THE INVENTION

This problem is solved by a sanitary article, particularly a sanitary fitting or a plumbing fitting, having a coated surface and which is characterized in that on one coating face and/or below one coating face there is at least one print image which is color-contrasted with respect to the coating.

The sanitary article or the coated part can essentially be made from a material having a good thermal conductivity and in particular a metallic material. Advantageously said sanitary article or coated part is made from metal, e.g. from copper alloys or die cast zinc. For corrosion protection purposes the metal article is preferably nickel plated. Unlike in the case of the chromium plate surface, the nickel plated surface is less smooth. However, as a result it is more suitable for a further coating to be applied thereto, e.g. a varnish or plastic coating.

Preferably the sanitary article or the printed part thereof is made from a material, which is thermally stable up to temperatures of 150° C. and in particular up to 250° C.

The print image can be a design, inscription, picture, pattern and/or decor which color contrasts with the background. Preferably the print image is a decor, particularly a flat decor. In addition, the print image is preferably in the form of a multicolor print. The color print can be in the form of a pigmented varnish coating, e.g. applied using organic and/or inorganic pigments.

The printing ink or color of the print image can consist of a colored or dyed thermosetting material. In another embodiment the printing color of the print image can be constituted by a colored or dyed thermoplastic material.

Advantageously the print image can be in the form of a metalcontaining, e.g. wholly or partly metal deposited or metal coated decor. Preferably the decorative metal is constituted by gold, e.g. in the form of a gold deposited coating, gold powder or gold leaf. The print image can be in the form of a combination of a single or multiple color print with a metallic print image.

A coating layer optionally placed below the print image can consist of a stoved primer. Preferably a priming coating is formed from a thermosetting material. Epoxy resin is particularly suitable as a result of its good mechanical characteristics for the purpose of such coatings. Polyester resin is also suitable as a polymer material for such coatings. Conventionally coatings based on polymers are applied in powder varnish form, which is cured at approximately 180° C. In another embodiment conventional solvent-containing lacquers, so-called wet lacquers, are used as primers and applied by conventional application processes, e.g. spraying processes. A top coating placed above the print image is at least translucent and is preferably transparent. Advantageously at least one upper coating layer is formed from a thermosetting resin, particularly an epoxy resin and preferably an epoxy clear lacquer. According to another embodiment an upper coating can be formed from a thermoplastic resin, particularly a polyester resin and preferably a clear polyester coating. Such a top coating protects the underlying print image from the action of aggressive media or mechanical attacks and therefore gives it a greater permanence. Particularly in embodiments with thermoplastic material as the printing ink or color a top coating is advantageous. The optical effect of the print image is not impaired, particularly when using a clear lacquer. This further coating layer increases the thickness of the surface coating of the sanitary article, so that the thus treated article has an improved protective coating effect.

DETAILED DESCRIPTION OF THE PREFERRED EMBODIMENTS

In an embodiment of the invention the print image can be in the form of a thin foil or film, particularly in the form of a band or strip, which is provided with a top coating. Preferably such a metal-containing print image is in the form of a foil print image. In a preferred embodiment the foil print image can in particular be a gold-containing foil print image and preferably a gold-coated foil strip. The foil or film material can in particular be a thermoplastic polymer film. With particular advantage the film material can be a not completely cured, thermosetting polymer film. After curing the polymer there is a stable coating containing the print image, in which the latter is covered by the polymer film. Optionally there is no need for an additional top coating. In a preferred embodiment to the metal decor-containing coating is applied a further clear lacquer coating, as described hereinbefore, in order to further improve the characteristics of the coated surface.

The structure of the surface coating can in particular be such that the individual layers of the coating are firmly interconnected at their contacting faces. The individual layers of the coating structure can have preferred coating thicknesses of in each case 10 to 100 $\mu$m.

A suitable process for the application of a print image to a sanitary article or to part of the latter is characterized in that a print image formed beforehand on a support can be applied with or without said support to the sanitary article. Advantageously the application of the print image takes place in a hot-stamping or embossing process. The print image to be applied can be in the form of a thin embossing or hot-stamping film with a suitable design and with appropriate dimensions. The embossing process can in particular be used in the coating of sanitary fittings for the application of different colored decors, particularly gold decors.

The support foil or film for the print image can be a thermoplastic polymer film, e.g. a polyester film. According to another embodiment the support film for the print image can be a duroplastic polymer film, particularly using a not completely cured polymer. In another embodiment a paper web provided with the print image of the type, e.g. known from heat transfer processes, can be used.

Advantageously during the application the print image is hot and preferably has a temperature of at least 100° C. According to a preferred embodiment the sanitary article is initially provided with a primer in the form of a powder coating. For this purpose the coating powder, e.g. is applied electrostatically by means of a powder gun and without additional heating to the fitting surface. The powder-coated article is then brought into a suitable furnace or oven, e.g. a tube furnace or oven, where at approximately 180° C. the polymer resin powder melts and a stoved or cured lacquer coating forms.

With particular advantage a print image can be applied to the sanitary article still hot from the application of a stoved coating and namely on the freshly formed coating. Following the application and pressing of the film provided with the print image onto the sanitary article, the coloring agent or metal of the decor adheres to the article surface. The preheating of the surface to be coated aids the adhesion and the desired, permanent firm connection of the coating surfaces.

According to an embodiment of the process according to the invention following the adhesive connection of the print image coloring agent to the article surface, the print image support film is removed. In this case it is preferable to use a support film made from material which can easily be separated from the print image. The support material is in particular chosen in such a way that the support web does not adhere to the hot surface of the article to be coated and can be removed without leaving any residues. Advantageously use is made of a plastic film with a higher melting point than the curing temperature of the coating e.g. a polyester film. Other support webs which are advantageous from the separation standpoint can be made from metal or paper.

When using a paper web as the support material, apart from a single or multi-colored or metal-containing print image, at least one further coating of curable polymer material can be applied. This further coating can be transferred with the print image to the sanitary article to be coated and, as a function of its position on the support web, forms a coating above and/or below the print image. With particular advantage the additional coating applied to the support web is a thermosetting polymer resin, preferably an epoxy resin. During the subsequent heating to 150° to 220° C., the thermosetting coating is cured. In this way it is possible to apply to the fitting to be coated a top coating, particularly a clear lacquer coating, at the same time as the print image in the form of a combined print image-lacquer coating. This economizes a further working step for clear lacquering purposes.

According to a further embodiment of the process according to the invention the print image is applied together with the support film to the sanitary article and the support film is left on the article in the form of a coating. Advantageously a film is used which is made from a material particularly suitable for surface coatings, e.g. from a thermosetting resin, which in particular has not yet completely been cured. It is also possible to use a thermoplastic resin film. The polymer coating cures by heating to 150° to 220° C. The print image support film left behind can in this way form a coating protecting the print image.

Advantageously the print image applied can be coated with at least one further coating layer. In a further embodiment according to the invention the print image applied to the sanitary article together with the support film can be coated with a further coating layer.

In an embodiment in which a print image of a colored or dyed thermosetting material, e.g. based on epoxy resin, is applied to the article, optionally there is no need to apply a further top coating, such as, e.g. a clear lacquer coating. After curing at approximately 180° C. the print image coating has an adequate resistance to mechanical and chemical attacks. The process for the surface coating of a sanitary article is in particular made simpler by saving the stages of applying the top coating. The overall coating thickness of the surface coating of the article, when using a correspondingly chosen thickness of the primer and the print image, can be within the normal coating thickness ranges.

It is in particular possible to apply primer and/or top coating layers in the form of a powder lacquer or varnish and cure same at temperatures of 150° to 220° C. This coating application preferably takes place as a powder coating using conventional processes. The material for the top coating is advantageously constituted by thermosetting resins such as epoxy lacquers, particularly epoxy clear lacquers. Thermoplastic resins, such as in particular polyester resins are also suitable for coatings.

In another embodiment the finish can be applied in the form of a conventional solvent-containing lacquer, e.g. using conventional spraying processes.

BRIEF DESCRIPTION OF THE DRAWINGS

To illustrate certain aspects of the invention.

FIG. 1 depicts a cover and a layer of a sanitary mixing valve for a bath tub;

FIG. 2 is a cross section of the cover shown in FIG. 1 along lines II—II; and, FIG. 3 is an enlarged detail of the cross section shown in FIG. 2.

FIGS. 1 to 3 show a cover 1 and a layer 2 of a sanitary fitting, namely a sanitary mixing valve for a bath tub. The cover 1 bears a print image 3 according to the invention. The cover 1 is made of nickel plated brass. The outer surface of the cover 1 is coated according to example 1, provided herein, with a primer coating layer 4 consisting of cured epoxy resin. Letters are printed onto this layer 4 forming the print image 3 from a polyester support film. The print image is covered and protected by a top coating 5 of a clear laquer.

Figure 1:
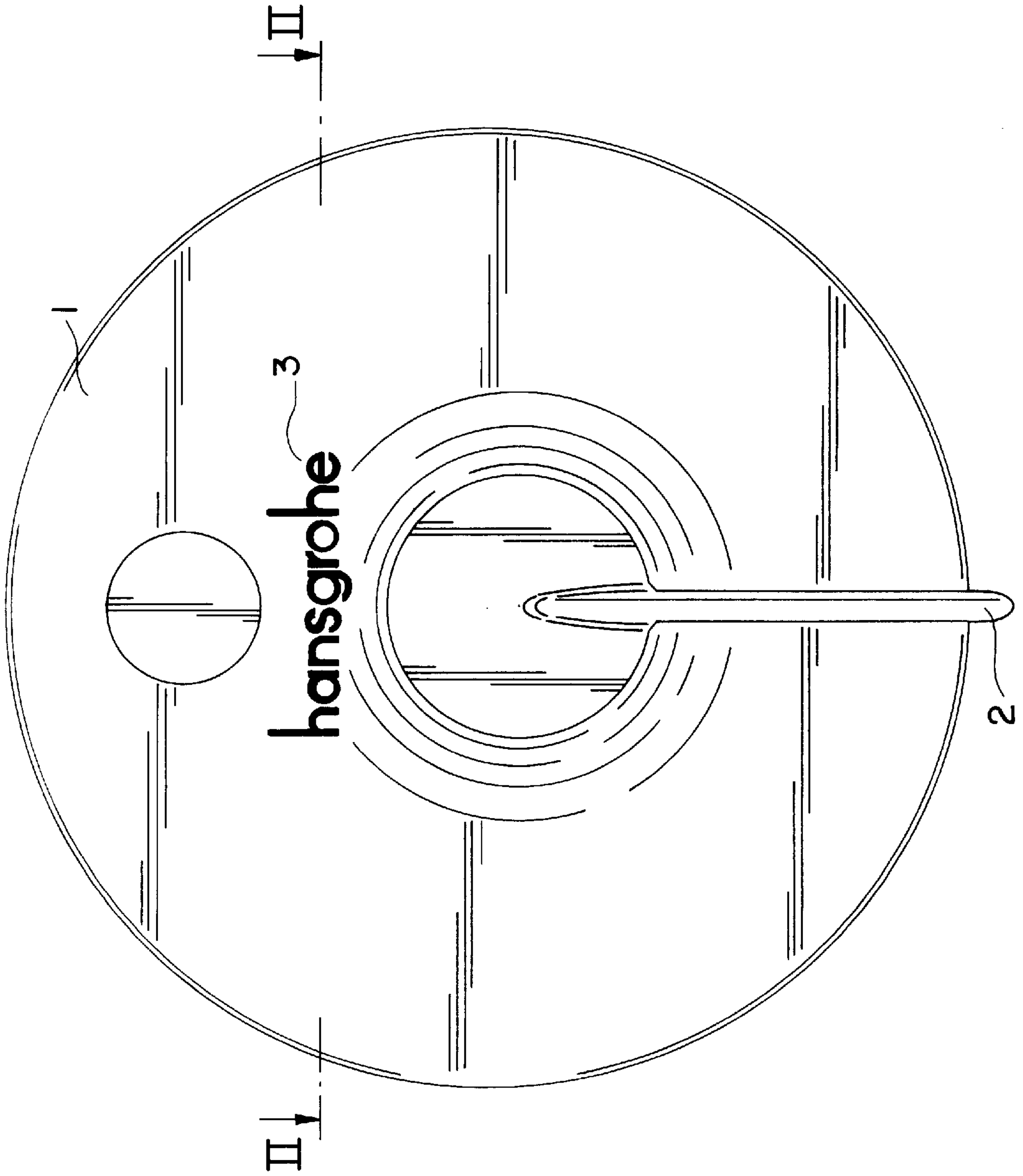
FIGS. 1 through 3 are provided as follows.
Figure 2:
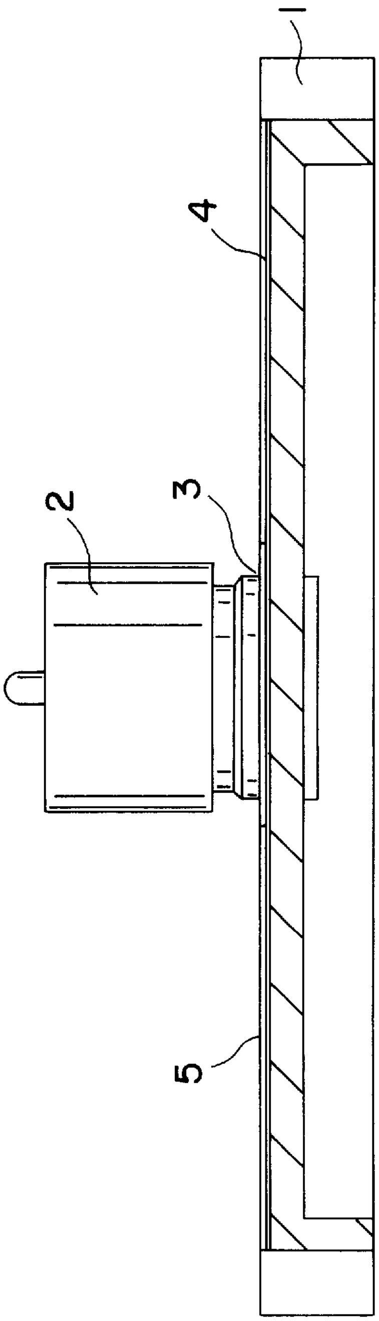
Figure 3:
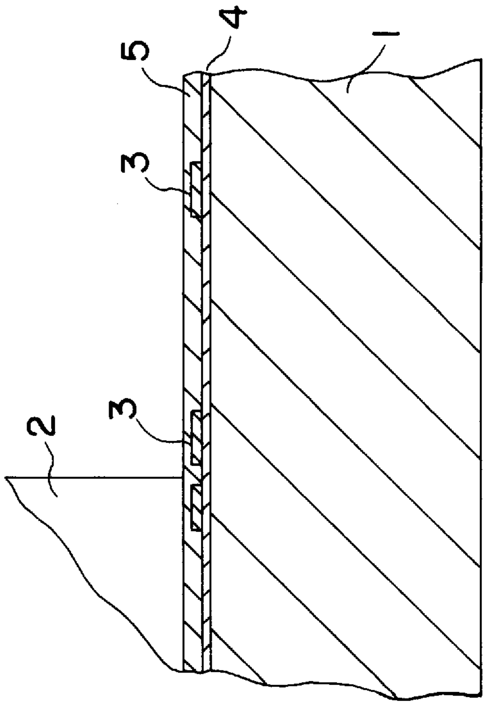

To further illustrate the features and details of the invention the following examples are provided.

EXAMPLE 1

For preparing the surface coating the sanitary fitting made from nickel-plated brass undergoes the standard pretreatment stages in connection with metal coating for the purpose of removing any adhering particles and impurities. A primer coating in the form of a powder lacquer coating of epoxy resin is applied to the cleaned, dry metal surface. The powder coating, e.g. takes place electrostatically with the aid of a powder gun and without any additional heating. The powder-coated article is then heated to approximately 180° C. in a conventional oven, e.g. a tube oven, this being the curing temperature of the thermosetting material powder, so that a cured lacquer coating is formed during a residence time of approximately 30 minutes. Immediately following this to the still hot, primer-coated fitting is applied an embossing film printed with a multicolored decor and is pressed onto the surface, e.g. with an embossing roller. The print image in the form of a pigmented lacquer coating based on thermoplastic material is formed on a polyester support film. The coloring agent of the print film adheres to the surface as a result of the heat of the coating face and the embossing pressure exerted. The polyester film is completely removed after the print image decor has been transferred to the sanitary article in this way. In the form of a top coating is now applied a clear lacquer in the form of a powder coating and is cured at approximately 180° C., corresponding to the procedure used during priming. In this way a smooth surface coating is formed, which protects the fitting and the decor made in the coating against chemical and mechanical attacks.

EXAMPLE 2

In the case of a surface coating according to example 1 on the priming coating is initially applied a further colored varnish coating. This is followed by the transfer of the decor and the top coating in accordance with the procedure of example 1.

EXAMPLE 3

In the case of a surface coating in accordance with example 1, the print decor is applied in the form of a pigmented lacquer coating of thermosetting material to a polyester support film. After removing the support web in the manner described hereinbefore, the thermosetting decor is cured by heating to 150° to 220° C. and in this way forms the top coating of the coated article.

EXAMPLE 4

In the case of a surface coating according to example 2, to a colored varnish coating applied as a primer is applied a decor in the form of a film strip coated with metallic gold. The film comprises a not completely cured, thermosetting polymer and remains on the fitting surface as a coating component. Both the decor material and the support film adhere to the fitting surface to be coated and are jointly cured to a lacquer coating at approximately 180° C. The polymer-containing coatings are connected together by melting or sintering. In this way the gold decor is incorporated into the coating. Subsequently in the form of a top coating is applied a clear lacquer coating and undergoes curing, in the manner described in example 1.

We claim:

1. A sanitary fitting having a surface at least partially coated with a polymer film coating of thermosetting material thereby forming at least one coating face, at least one permanent print image on a polymer support film placed on at least part of said coating face by hot stamping, said permanent print image having at least one color which contrasts with a color of the polymer film coating, wherein at least the part of the sanitary fitting is made of metal and wherein the polymer film surface and the permanent print image are firmly interconnected at the coating face.

2. The sanitary fitting according to claim 1, wherein the at least partially coated surface of the sanitary fitting is made from a metallic material.

3. The sanitary fitting according to claim 1, wherein at least that part of the sanitary fitting provided with the permanent print image is made from a material which is thermally stable at temperatures of 150° C. to 250° C.

4. The sanitary fitting according to claim 1, wherein at least that part of the sanitary fitting provided with the permanent print image is made from a material which is thermally stable at temperatures of 180° C. to 250° C.

5. The sanitary fitting according to claim 1, wherein the print image has at least one image having a color, and wherein the image color contrasts with the color of the polymer film coating.

6. The sanitary fitting according to claim 1, wherein the permanent print image is a flat decor.

7. The sanitary fitting according to claim 1, wherein the permanent print image is a multicolor print.

8. The sanitary fitting according to claim 1, wherein a printing color of the permanent print image consists of a colored or dyed thermosetting material.

9. The sanitary fitting according to claim 1, wherein a printing color of the permanent print image comprises a colored or dyed thermoplastic material.

10. The sanitary fitting according to claim 1, wherein the permanent print image is a metal containing decor.

11. The sanitary fitting according to claim 1, wherein the permanent print image is a gold decor.

12. The sanitary fitting according to claim 1, wherein the polymer film coating comprises a staved primer.

13. The sanitary fitting according to claim 1, comprising a translucent top coating layer placed above the print image.

14. The sanitary fitting according to claim 1, comprising at least one upper coating layer formed of a cured, thermosetting resin and wherein the upper coating layer is placed above the print image.

15. The sanitary fitting according to claim 1, comprising at least one upper coating layer formed of a thermoplastic resin and wherein the upper coating layer is placed above the print image.

16. The sanitary fitting according to claim 14, wherein the upper coating layer is formed from the polymer support film.

17. The sanitary fitting according to claim 1, comprising at least one upper coating layer placed above the print image and wherein the print image is in the form of a band or strip.

18. The sanitary fitting according to claim 1, wherein the polymer film coating has a coating thickness of 10 to 100 μm.

19. The sanitary fitting according to claim 1, comprising a transparent top coating placed above the print image.

20. The sanitary fitting according to claim 13, wherein the translucent top coating layer has a coating thickness of 10 to 100 μm.

21. The sanitary fitting according to claim 19, wherein the transparent top coating layer has a coating thickness of 10 to 100 μm.

22. The sanitary fitting according to claim 15, wherein the upper coating layer is formed from the polymer support film.

* * * * *